G. C. SMITH.
PLOWING DEVICE.
APPLICATION FILED JULY 29, 1919.
1,324,937.
Patented Dec. 16, 1919.
7 SHEETS—SHEET 2.
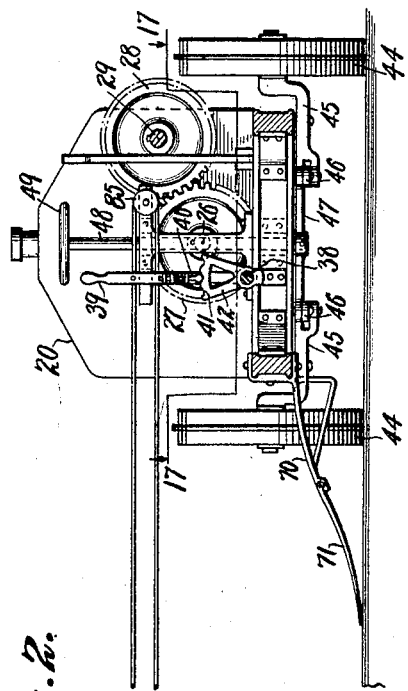
Fig. 2.
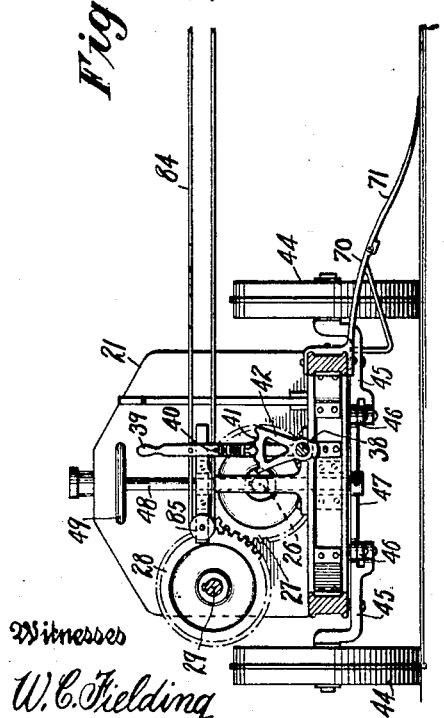
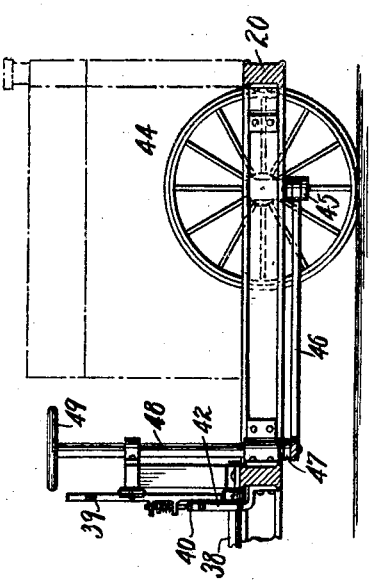
Fig. 16.
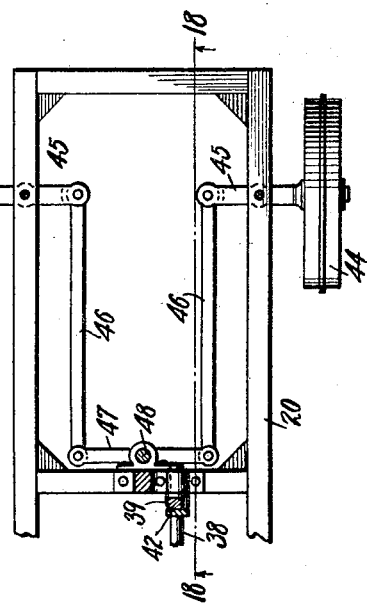
Fig. 17.
Witnesses
W. C. Fielding
Augustus B. Copper
Inventor
George C. Smith
By Joshua R. H. Potts
His Attorney

G. C. SMITH.
PLOWING DEVICE.
APPLICATION FILED JULY 29, 1919.

1,324,937.

Patented Dec. 16, 1919.
7 SHEETS—SHEET 3.

Witnesses
W. C. Fielding
Augustus B. Coppes

Inventor
George C. Smith
By Joshua R. H. Potts
His Attorney

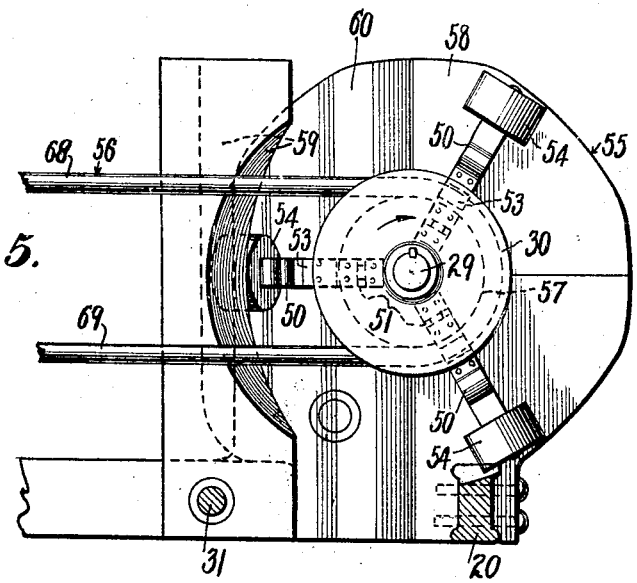
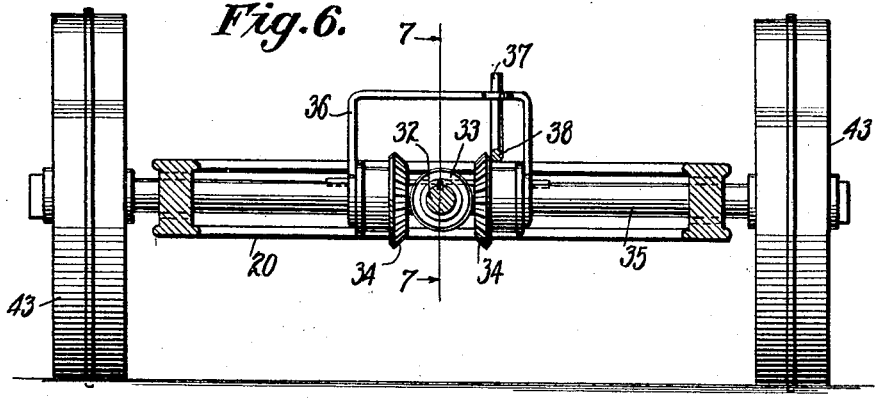
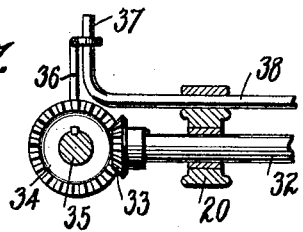

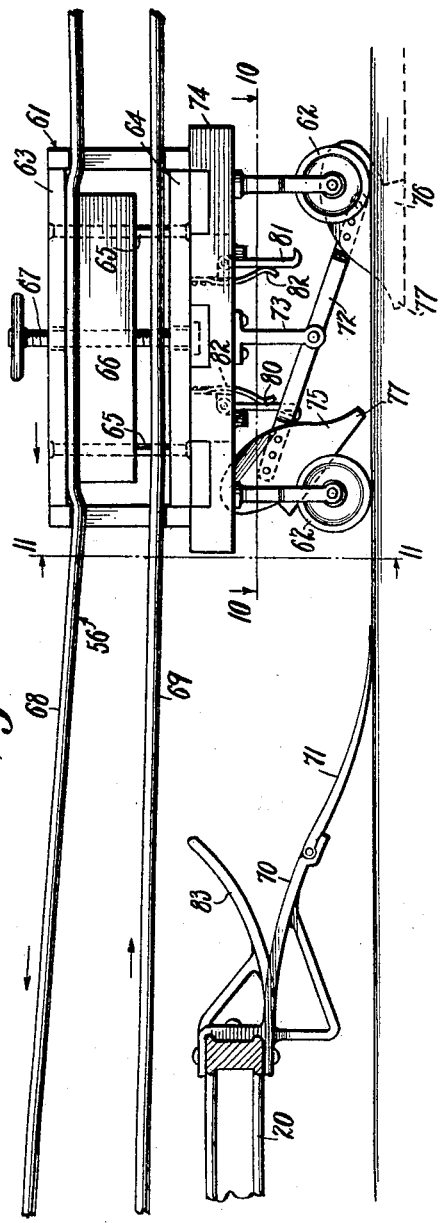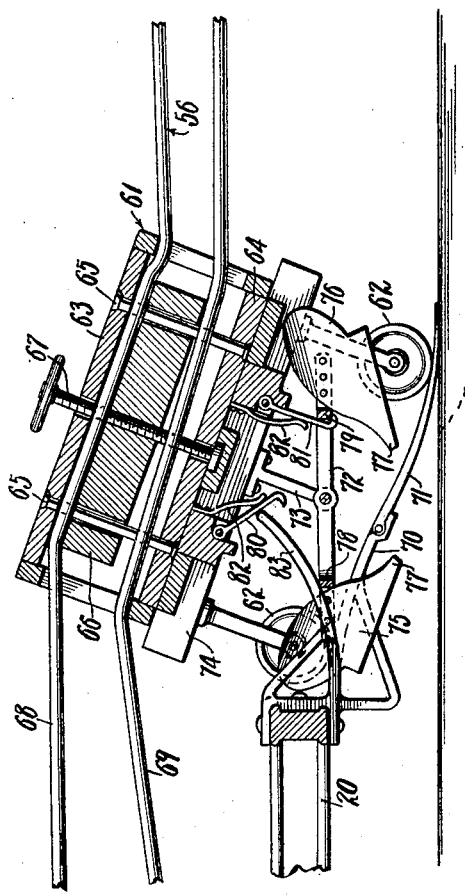

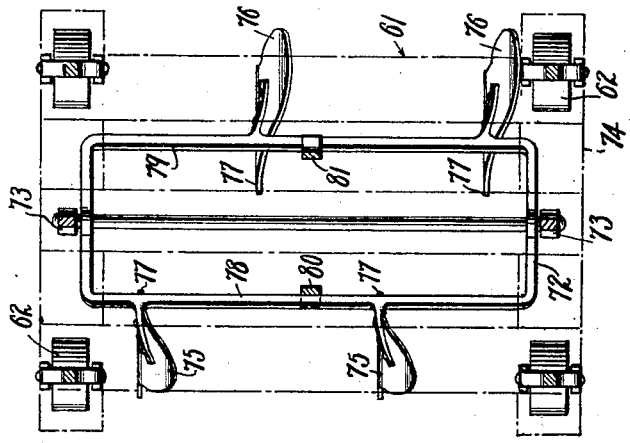
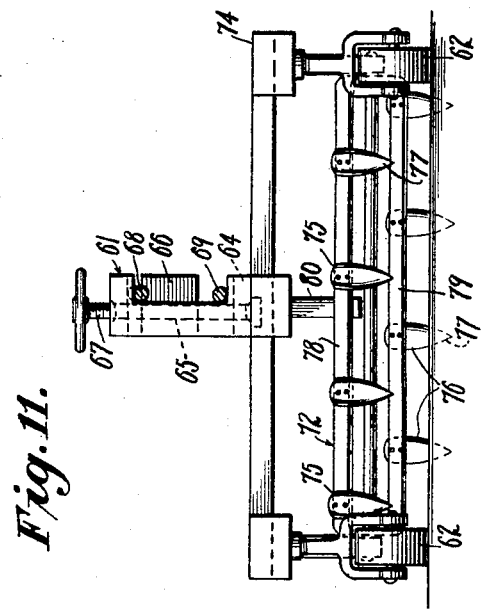
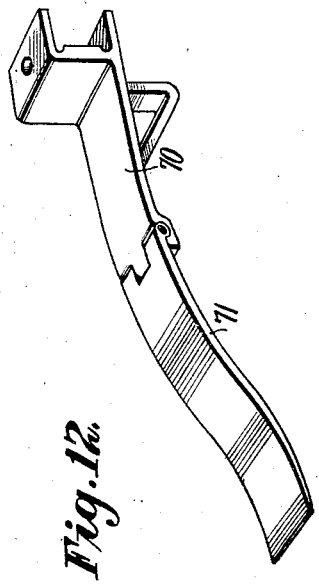

G. C. SMITH.
PLOWING DEVICE.
APPLICATION FILED JULY 29, 1919.
1,324,937.
Patented Dec. 16, 1919.
7 SHEETS—SHEET 7.
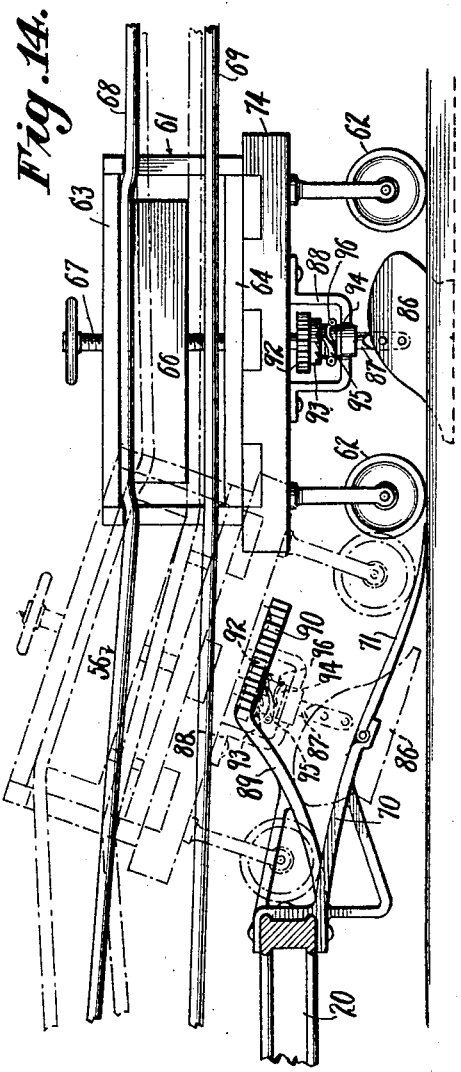
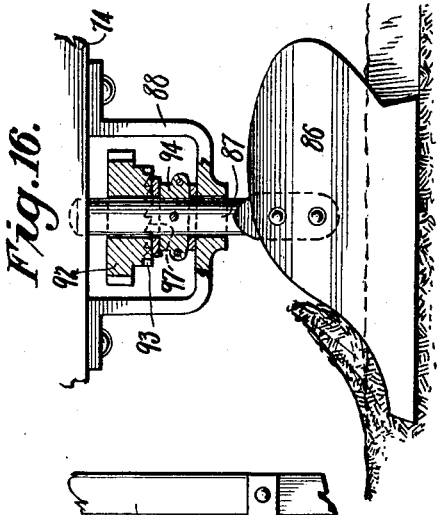
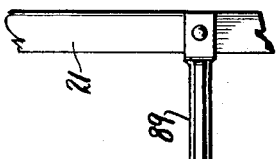
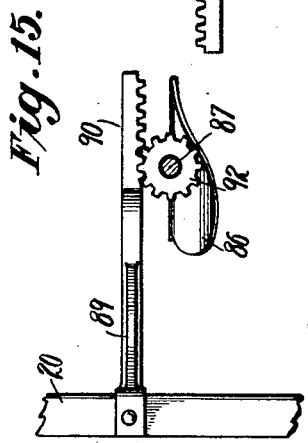
Witnesses
W. C. Fielding
Augustus B. Copper
Inventor
George C. Smith
By Joshua R. H. Potts
His Attorney

UNITED STATES PATENT OFFICE.

GEORGE C. SMITH, OF ERIE, PENNSYLVANIA.

PLOWING DEVICE.

1,324,937.  Specification of Letters Patent.  Patented Dec. 16, 1919.

Application filed July 29, 1919. Serial No. 314,113.

*To all whom it may concern:*

Be it known that I, GEORGE C. SMITH, a citizen of the United States, residing at Erie, in the county of Erie and State of Pennsylvania, have invented certain new and useful Improvements in Plowing Devices, of which the following is a specification.

One object of my invention is to provide an improved mechanically operated plowing device which will quickly plow large stretches and areas of ground.

Another object is to so construct my invention that it can plow a field from side to side and thereby avoid any rounding of corners of the field as is done with the ordinary tractor plows or horse plows.

A further object is to make the device of my invention of a durable construction which can be easily operated and controlled.

Figure 1:
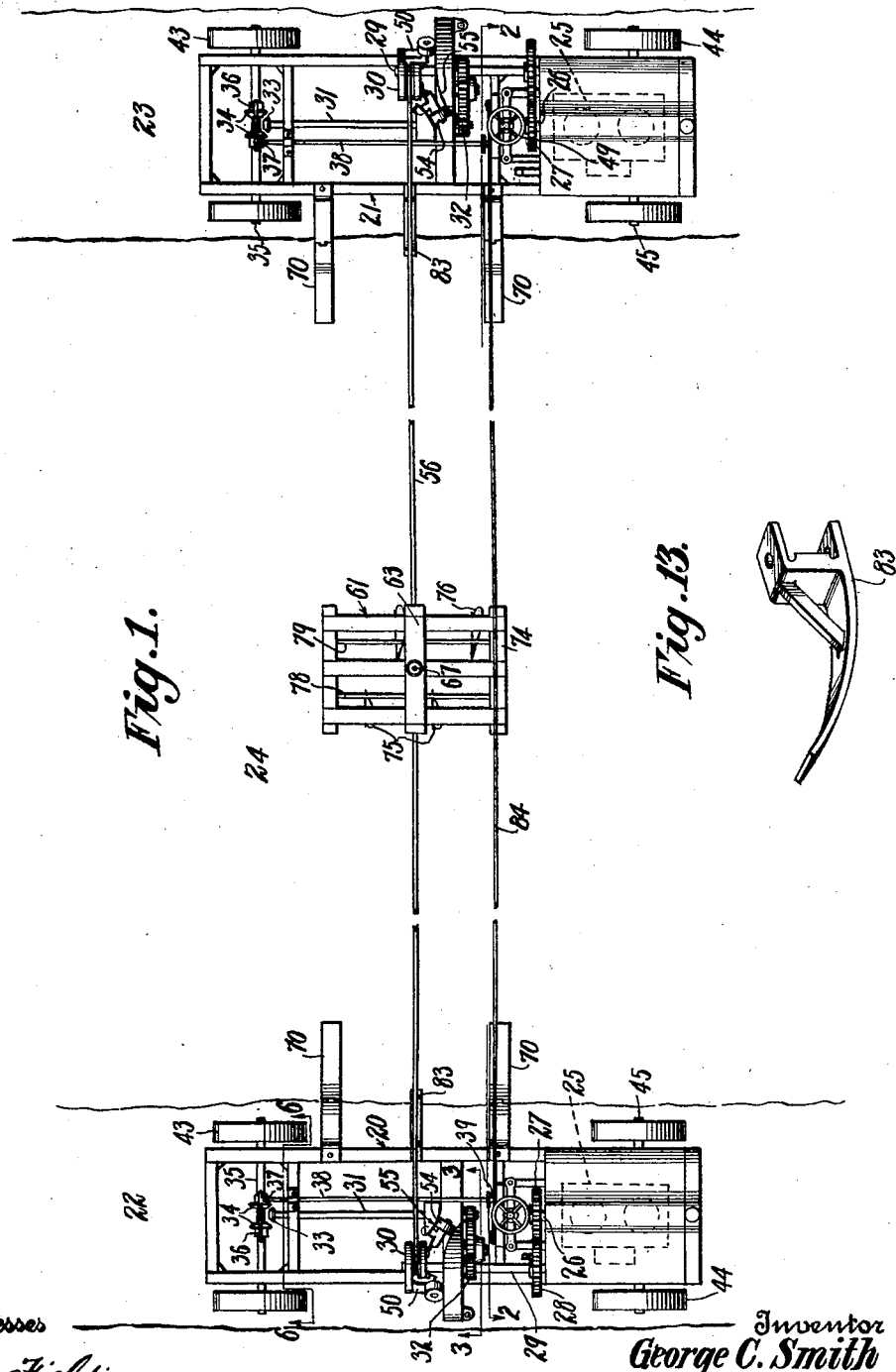
Figure 3:
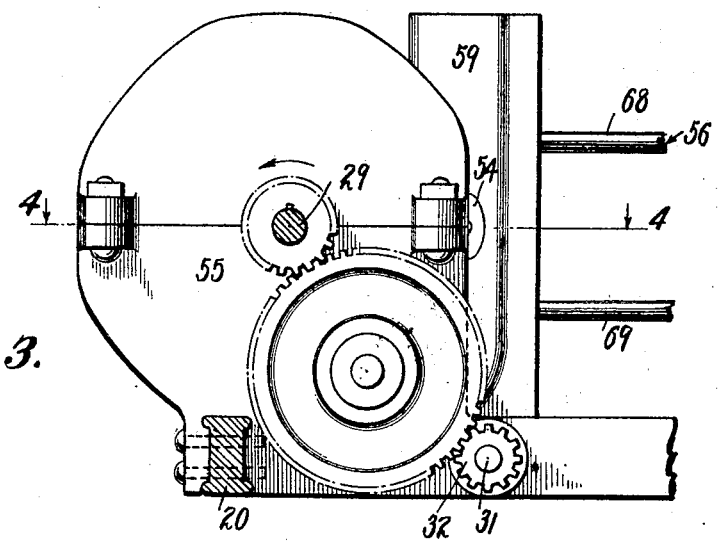
Figure 4:
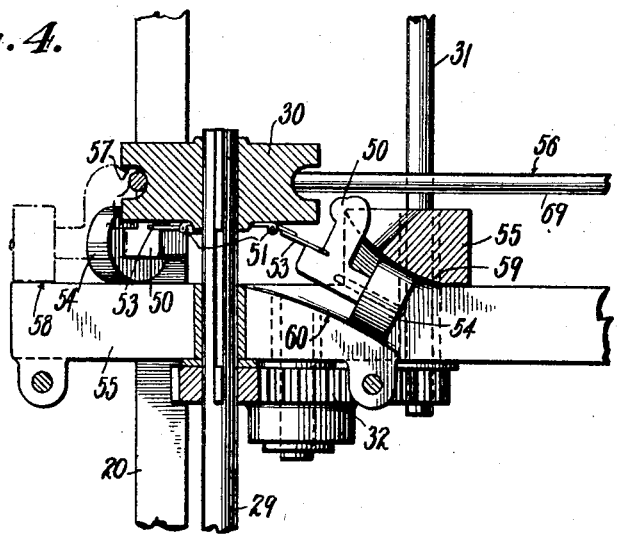

These objects, and other advantageous ends which will be described hereinafter, I attain in the following manner, reference being had to the accompanying drawings in which Figure 1 is a top plan view of my improved plowing device, showing the same in position when plowing a field, Fig. 2 is a sectional elevation taken on the line 2—2 of Fig. 1 and drawn on a slightly larger scale than Fig. 1 with the plowing means omitted, Fig. 3 is an enlarged fragmentary section taken on the line 3—3 of Fig. 1, Fig. 4 is an enlarged fragmentary section taken on the line 4—4 of Fig. 3, Fig. 5 is a view of the opposite side of the elements shown in Fig. 3, Fig. 6 is an enlarged sectional elevation taken on the line 6—6 of Fig. 1, Fig. 7 is a fragmentary section taken on the line 7—7 of Fig. 6, Fig. 8 is a fragmentary front elevation showing the plowing means and certain of the elements which actuate the plowing means, Fig. 9 is a view of the elements illustrated in Fig. 8, after the relative position therebetween has been changed to actuate the plowing elements, Fig. 10 is a section taken on the line 10—10 of Fig. 8, Fig. 11 is a section taken on the line 11—11 of Fig. 8, Fig. 12 is a perspective view of a cam rail which forms a part of my invention, Fig. 13 is a perspective view of a latch tripper which forms a part of my invention, Fig. 14 is a fragmentary front elevation, partly in section, showing a modified form of plowing means and elements for actuating the plowing means, Fig. 15 is a top plan view showing diagrammatically various elements operative to reverse the plowing member illustrated in Fig. 4, Fig. 16 is a central vertical section showing the mounting of the plowing member shown in Figs. 14 and 15, Fig. 17 is a fragmentary sectional top plan view showing the arrangement of the steering elements of motor driven vehicles forming a part of my invention, said section being taken on the line 17—17 of Fig. 2, and Fig. 18 is a section taken on the line 18—18 of Fig. 17.

Referring to Figs. 1 to 13 inclusive and Figs. 17 and 18, 20 and 21 represent two motor-driven vehicles which are adapted to move substantially parallel to each other over roadways or paths 22 and 23 at each side of a field 24, as clearly shown in Fig. 1. Each of these motor-driven vehicles has similar elements thereon which constitute a part of my invention and it is therefore only necessary to describe specifically the elements on one of said vehicles and it will be understood and seen from the drawings that the other vehicle has corresponding elements thereon.

Each of the vehicles has a motor 25 for operating a main power shaft 26. A gear 27 on the shaft 26 operates a gear 28 on a secondary shaft 29. The shaft 29 has a sheaved or grooved pulley 30 secured thereto. A countershaft 31 is operatively connected to the secondary shaft 29 by a chain of gears 32 and the rear end of the shaft 31 has a bevel gear 33 thereon adapted to mesh with either of oppositely disposed bevel gears 34 on a rear axle 35, said bevel gears being slidable common to said shaft 35 and connected by a yoke 36. This yoke 36 is connected by the crank end 37 by a rotatably mounted rod 38 so that when the rod 38 is rocked, the bevel gears 34 will be alternately moved into engagement with the driving bevel gear 33 on the counter-shaft 31. The rod 38 at its forward end is connected to a hand-operated lever 39 which has a spring-pressed latch 40 thereon adapted to engage in notches 41 in a segment 42; the latch being rounded so that the lever 39 can be moved in opposite directions when desired, but the spring-pressed latch will prevent accidental movement of said lever. The rear axle 35 has traction wheels 43 secured thereto and front or steering wheels 44 are connected to forward axles 45, said axles being joined by links 46 to a cross arm 47 connected to a steering post 48; said steering post being provided with the usual hand-steering wheel 49.

The pulley 30 on each of the vehicles 20 and 21 has clamp jaws 50 hinged thereto at 51; each of the hinge connections including a flexible plate 53 which is preferably made of sheet spring steel. The clamp jaws 50 have anti-friction rollers 54 pivoted thereon and these anti-friction rollers, when the pulleys 30 are rotated, are adapted to be engaged by cams 55 which are fixed on the vehicles. An endless cable belt 56 is operatively connected to the pulleys 30 and extends across the field 24 or in other words extends from one vehicle to the other, as clearly shown in Fig. 1. The cable 56 rides in the grooves 57 of the pulleys 30 and the clamp jaws 50 are operative when the anti-friction rollers 54 engage the bead portions 58 of the cam 55 to press the cable 56 within the grooves 57 of the pulleys 30 and thereby clamp or bind the cable to the pulleys. The cams 55 include drawing out portions 59, as clearly shown in Figs. 4 and 5, and this drawing out portion together with the cam surface 60 causes the jaws 50 to be moved out of engagement with the cable 56 at the points where said cables are tangent to the pulleys. It will thus be noted that when the motors 25 are operated, the pulleys 30 will be rotated to actuate the cable 56.

Plowing means as illustrated includes a carriage 61 which has ground engaging rollers 62. The carriage includes a top beam 63 and a bottom beam 64 which are spaced apart. Guide rods 65 extend from the top beam to the bottom beam and form guides for a movable block 66, said block being operative by a clamp screw 67 to be moved upwardly and downwardly between the beams 63 and 64. The top run 68 of the cable 56 extends between the top of the block 66 and the top beam 63, and the bottom run 69 of the cable 56 extends between the block 66 and the bottom beam 64. Thus by operating the clamp screw 67, the block 66 can be moved to clamp either the upper or lower run of the cable 56 to the carriage and the carriage will take the movement of the cable run to which it is clamped. Hence, it will be understood that by manipulating the clamp screw 67, the carriage can be conveyed by the belt 56 in either direction across the field 24.

Each of the vehicles 20 and 21 has cam rails 70 secured thereto, said cam rails being preferably made in the form of ogee curves; the outer free ends 71 extending in close proximity to the ground for the purpose of permittting the rollers 62 on the carriage 68 to roll upwardly thereon from the position shown in Fig. 8 to the position shown in Fig. 9 for a purpose now to be described.

A frame 72 is pivoted within its length to a bracket 73 depending from the base 74 of the carriage 61 and this frame 72 has ground-plowing members 75 and 76, the ground-engaging ends 77 of which extend toward each other as clearly illustrated in Figs. 8 and 9. The frame 72 has bars 78 and 79 which are adapted to be engaged by latches 80 and 81 respectively so that when the frame 72 is tilted to move the plowing member 76 into the ground, the plowing members 75 will be held out of the ground, as clearly shown in Fig. 8. These latches 80 and 81 are backed by springs 82 so as to hold the latches in engagement with the bars 78 and 79 until the latches alternately engage trippers 83 secured to the sides of the vehicles. Fig. 9 shows the latch 80 having engaged the tripper 83 on the vehicle 20 and the tripper 83 having been engaged by the bar 78 to swing the plowing members 76 toward the carriage base 74 to permit the latch 81 to engage the bar 79. This action moves the plowing members 75 downwardly relative to the base 74 and when the clamp block is moved into clamping engagement with the lower run of the cables 56, the carriage 61 will be moved in a transverse position across the field and the members 75 will serve to plow a furrow in the field. By this arrangement, the carriage is moved upwardly so as to raise the plowing elements out of engagement with the ground and then the plowing members are shifted relatively to each other as above described. This permits the members 75 and 76 to have the roll of the plow blade on the same side to cause the furrows to be turned in the same direction. A rope 84 is connected to the levers 38; said rope being in the form of a belt passing over pulleys 85, as clearly shown in Fig. 2. Thus after each furrow is plowed or series of furrows in view of the number of plowing members on the carriage 61, the vehicles can be advanced by an operator pulling on the rope 84 in order to cause the vehicles to be advanced along the roadways 22 and 23. An operator can ride on the carriage 61 and can operate the clamping screw 67 so as to cause the carriage to stop after it has moved upwardly on the rails 70. Then by turning the clamp screw to engage the opposite run of the cable 56 to which it had been previously clamped, the carriage will be moved in an opposite direction. The rope 84 is preferably placed, for example as shown in Fig. 1, in such position that it can be readily reached by the operator while on the carriage 61 and thereby simultaneously move the levers 39 to cause either one of the gears 34 to mesh with the gear 33 on each vehicle and thereby cause the vehicle to be advanced.

In the modified form of my invention shown in Figs. 14, 15 and 16 instead of having two series of the plowing members as above described and alternately causing the series to be moved into and out of active plowing position with the ground, I have illustrated a plowing member 86 which is secured to a stud shaft 87, said stud shaft being rotatably mounted in a hanger bearing 88 on the carriage base 74. Brackets 89 are secured to the vehicles in place of the trippers 83. These brackets 89 have toothed racks 90 and 91 (see Fig. 15 particularly). A gear wheel 92 is freely rotatable on the stud shaft 87 and has a ratchet 93 on its bottom surface. A collar 94 is secured to the stud shaft 87 and has a pawl 95 pivoted thereon; said pawl being held in engagement with the teeth of the ratchet wheel 93 by a spring 96. The teeth of the ratchet 93 are slanted as shown at 97 so that when the gear wheel 92 rotates in one direction it will turn the stud shaft through the medium of the pawl 95 and collar 94. As shown in Fig. 15, the racks 90 and 91 are off-set with respect to each other. In other words, are positioned in planes at opposite sides of the plane including the axis of the stud shaft 87. Thus when the carriage 61 is moved into engagement with the rack 90, the gear 92 will be rotated clockwise and thereby turn the plowing member 86. This action occurs after the rollers 62 have moved upwardly on the rails 70 as shown in dot-and-dash lines in Fig. 14; it being noted that the racks 90 and 91 have sufficient number of teeth to cause the member 86 to be rotated at 80°. On the reverse movement of the carriage 61, the gear wheel 92 while passing over the rack 90 will be rotated anti-clockwise and in view of the slanting nature of the teeth of the ratchet 93, the pawl 95 will be pushed out of engagement with the ratchet so that the stud shaft 87 will not be rotated. However, when the wheel 92 engages the rack 91, it will be noted that the gear will again be moved clockwise and the plowing member 86 will then be reversed.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A plowing device including two vehicles spaced apart; a cable having two runs extending between said vehicles and continuously operative to move in opposite directions; plowing means; means movable in conjunction with said plowing means and having portions located respectively adjacent said runs of the cable; and a member interposed between said runs of the cable and adapted to move in opposite directions to alternately clamp said runs respectively to said latter mentioned portions whereby the plowing means will be alternately moved in opposite directions transversely between said vehicles; substantially as described.

2. A plowing device including two vehicles spaced apart; plowing means; means for moving said plowing means transversely between said vehicles, said moving means being operatively connected to said vehicles; and means on said vehicles for raising said plowing means relatively to the ground during said transverse movement whereby the position of the plowing means will be changed; substantially as described.

3. A plowing device including two vehicles spaced apart; plowing means; means for moving said plowing means transversely between said vehicles, said moving means being operatively connected to said vehicles; means for driving each of said vehicles; and means connecting said driving means of both of the vehicles, whereby by the movement of said latter connecting means the operation of the driving means of each vehicle will be effected and the vehicles can be simultaneously moved; substantially as described.

4. A plowing device including two vehicles spaced apart; a pulley on each of the vehicles; a cable belt operatively connected to said pulleys; means for rotating said pulleys; plowing means; means for alternately clamping said plowing means to opposite runs of said belt; cams on said vehicles; and clamp jaws having portions for engagement with said cams whereby the clamp jaws are moved into engagement with the cable while on the pulleys; substantially as described.

5. A plowing device including two vehicles spaced apart; a pulley on each of the vehicles; a cable belt operatively connected to said pulleys; means for rotating said pulleys; plowing means; means for alternately clamping said plowing means to opposite runs of said belt; cams secured to said vehicles; and clamp jaws flexibly secured to said pulleys and having portions movable into engagement with said cams whereby the clamp jaws engage the portions of said cable on the pulleys; substantially as described.

6. A plowing device including two vehicles spaced apart; plowing means; means for moving said plowing means transversely between said vehicles, said moving means being operatively connected to said vehicles; means for driving each of said vehicles and including a lever on each vehicle operative to stop or change the direction of movement of the vehicles; and common means operatively connecting the levers on both vehicles; substantially as described.

7. A plowing device including two vehicles spaced apart; plowing means; means for moving said plowing means transversely between said vehicles, said moving means being operatively connected to said vehicles; means for driving each of said vehicles and including a lever on each vehicle operative to stop or change the direction of movement of the vehicles; and common means operatively connecting the levers on both vehicles, said connecting means being located adjacent the path of movement of said plowing means whereby a person on said plowing means can actuate said latter connecting means; substantially as described.

In testimony whereof I have signed my name to this specification in the presence of two subscribing witnesses.

GEORGE C. SMITH.

Witnesses:
 ANNA RENTON,
 CHAS. E. POTTS.